[11] Patent Number: 4,492,856
[45] Date of Patent: Jan. 8, 1985

[54] APPARATUS FOR EFFECTING FOCUS CONTROL FOR USE IN OPTICAL DISC PLAYER

[75] Inventor: Kenji Kimura, Tachikawa, Japan

[73] Assignee: Olympus Optical Company Limited, Japan

[21] Appl. No.: 375,305

[22] Filed: May 5, 1982

[30] Foreign Application Priority Data

May 14, 1981 [JP] Japan .................................. 56-71341

[51] Int. Cl.$^3$ ............................................... G01J 1/20
[52] U.S. Cl. ...................................... 250/201; 369/45
[58] Field of Search .................... 369/45; 250/201, 204

[56] References Cited

U.S. PATENT DOCUMENTS 4,358,774 11/1982 Wilkinson ............................ 250/204

Primary Examiner—David C. Nelms
Assistant Examiner—Ernest Austin, II
Attorney, Agent, or Firm—Parkhurst & Oliff

[57] ABSTRACT

An apparatus is disclosed for effecting a focus control of an objective lens with respect to a track having a crenellated pit construction recorded on an optical disc on which a light beam emitted from a laser light source is to be focused as a light spot by an objective lens. A light beam reflected by the disc is introduced via a reflection surface which is set substantially at a critical angle with respect to an optical axis onto a photodetector having four light receiving regions divided in orthogonal directions. A first focus signal is produced by deriving a difference between photoelectrically converted output signals from the light receiving regions in response to a variation in an average amount of the light projected on the photodetector. The output signals from the light receiving regions are further supplied to high pass filters and envelope detectors to derive two RF signal components modulated by the pit construction and a second focus signal is produced by deriving a difference between the RF signals. A very accurate focus control is effected in accordance with a composite focus signal obtained by mixing the first and second focus signals with each other.

6 Claims, 3 Drawing Figures

FIG_3
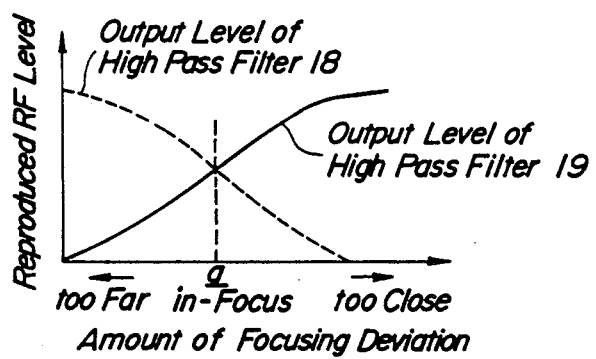

APPARATUS FOR EFFECTING FOCUS CONTROL FOR USE IN OPTICAL DISC PLAYER

BACKGROUND OF THE INVENTION

The present invention relates to an apparatus for effecting a focus control for use in an optical disc player, and more particularly to an improvement in an apparatus for detecting focus information with the aid of a reflection surface which is set at or nearly at a critical angle with respect to an incident light beam reflected by an optical disc. Such an apparatus has been disclosed in a copending U.S. patent application Ser. No. 195,075 now U.S. Pat. No. 4,390,781 filed on Oct. 8, 1980.

In the focus detecting apparatus of a kind described in the preamble, a light beam emitted from a light source is made incident on an optical disc as a light spot, the light beam reflected by or transmitted through the optical disc is made incident upon a reflection surface which is set substantially at a critical angle with respect to an optical axis and the light beam reflected by the reflection surface is further introduced onto a photodetector having divided light receiving regions. Then, focus information representing a deviation of the light spot in the direction of the optical axis with respect to the optical disc is derived by detecting whether the reflected light beam is collimated, diverged or converged. In the in-focused condition, the reflected light beam becomes a parallel beam, whereas when the light spot deviates from the disc surface, the reflected light beam becomes diverged or converged depending upon a direction of the deviation. In this known apparatus, since a variation in amount of the reflected light beam in accordance with the focusing condition is detected photoelectrically, a detection accuracy is not always optimum.

FIG. 1 is a block diagram showing a principal construction of the known focus detecting apparatus for effecting a focus control. In FIG. 1, a laser light 1' emitted from a laser light source 1 is collimated by a collimator lens 2 into a parallel beam and is then focused onto an information track having a crenellated pit construction recorded on a disc 5 as a light spot by an objective lens 4 through a half mirror 3. The optical disc 5 is rotated by a motor M at a given constant speed such as 1,800 rpm. A light beam reflected by the disc 5 is collected by the objective lens 4 and is made incident upon a prism 8 through the half mirror 3. The light beam is further reflected by a reflection surface 8A of the prism 8 which surface is set substantially at a critical angle with respect to an incident light beam. Then, a light beam reflected by the prism 8 is made incident upon a photodetector 7. In FIG. 1, there is also shown a plan view of the photodetector 7 having four light receiving regions 100-103 divided in two orthogonal directions X and Y, X being in parallel with a track direction. In the in-focused condition, the light beam reflected by the reflection surface 8A is made incident upon a center of the photodetector 7, so that each of four regions receives the same amount of light. If the light spot projected onto the disc 5 is deviated from the in-focused condition, position and cross sectional shape as well as intensity distribution of the light beam impinging upon the four regions 100-103 are varied, and a light amount received by each of the regions 100-103 is varied accordingly. Photoelectrically converted output signals of four light receiving regions 100, 101 and 102, 103 are supplied to analog adders 9 and 10, respectively. Output signals of the adders 9 and 10 are supplied to a differential amplifier 11 so as to obtain a difference output signal representing focus information. The difference output signal thus obtained is amplified by a current amplifier 11 to derive a focusing control signal which is then supplied to a moving coil 6. Then the moving coil 6 moves in the optical axis direction in accordance with the detected focus information. The moving coil 6 is fixed to the objective lens 4, and therefore a distance from the disc surface to the objective lens 4 can be controlled in accordance with a magnitude of the current passing through the moving coil 6. As a result, a negative feedback loop for effecting the focus control is constructed to maintain the in-focused condition by controlling a position of the objective lens 4 in a most suitable position.

However, in the known apparatus mentioned above, photoelectrically converted output signals of the four light receiving regions 100-103 of the photodetector 7 do not represent the pit information but an average value of the light intensity projected onto the regions 100-103. Although there is a certain correlation between the light amount and a reproduced level of the pit information, i.e. the reproduced RF signal, they are not completely identical with each other. Moreover, in the in-focused condition, since the light spot having the smallest diameter is projected onto the track recorded on the disc and the optical resolution is highest, a variation of the light amount modulated by the pit on the disc, i.e. the reproduced RF signal level becomes maximum and thus, it is not always possible to detect the in-focused position accurately only by detecting the variation of the light amount. Further, the apparatus is so constructed that in the in-focused condition, the amounts of the light projected onto the light receiving regions 100, 101 and 102, 103 illustrated in FIG. 1 become identical with each other. Thus, the focus information is subjected to a variation or fluctuation due to an unevenness of a reflection factor of the disc surface and a variation of a detection sensitivity due to an inclination of the disc surface. Owing to the various reasons explained above, the known apparatus has a drawback in that the focusing control cannot be performed accurately and precisely.

SUMMARY OF THE INVENTION

The present invention has for its object to provide a novel and useful apparatus for effecting a focus control accurately by adding focus information derived from the reproduced RF signal to the usual focus information derived from the average value of the light amount projected onto the photodetector.

According to the invention, an apparatus for effecting a focus control for use in an optical disc player in which a light beam is projected onto an information track having a crenellated pit construction recorded on an optical disc as a light spot and a light beam modulated by said pit construction is made incident upon photoelectric converting means to produce an information signal, comprises means for introducing at least a part of said modulated light beam onto a photodetector having a plurality of light receiving regions divided in a given direction;

means for deriving a difference between output signals from said light receiving regions to produce a first focus information signal on a basis of a variation in amount of the light beam impinging upon the light receiving regions;

means for detecting from the output signals of said plurality of light receiving regions of the photodetector signal components modulated by the pit construction;

means for deriving a difference between said signal components to produce a second focus information signal on a basis of a variation in level of the signal components;

means for mixing said first and second focus information signals to produce a composite focus information signal; and means for effecting a focus control in response to said composite focus information signal to maintain the light spot focused on the optical disc.

BRIEF DESCRIPTION OF THE DRAWINGS

FIG. 3 is a graph depicting a relation between an output level of a high pass filter and a focus condition according to the invention.

DESCRIPTION OF THE PREFERRED EMBODIMENTS

Figure 1:
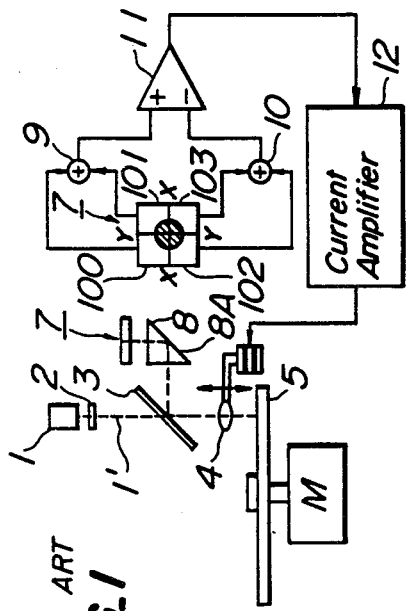
FIG. 1 is a block diagram showing a known apparatus for effecting a focus control.
Figure 2:
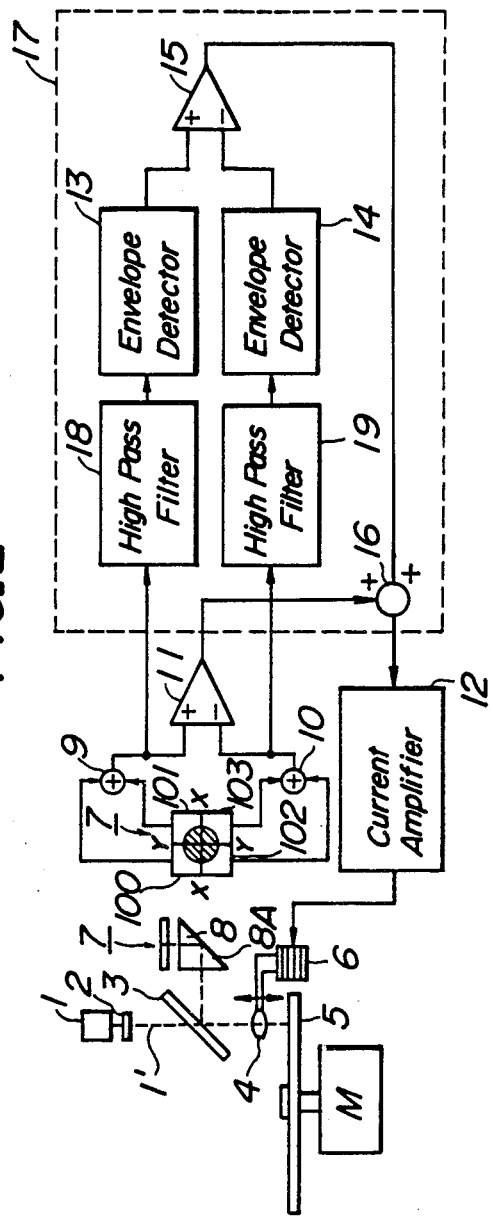
FIG. 2 is a block diagram illustrating one embodiment of the apparatus for effecting focus control according to the invention.

FIG. 2 is a block diagram showing an embodiment of the apparatus for effecting focus control according to the invention. In FIG. 2, a circuit portion enclosed by a dotted block 17 shows a part according to the invention and the remaining circuit portion is the same as that of the known apparatus shown in FIG. 1. A laser light beam 1' emitted from a laser light source 1 is collimated by a collimator lens 2 and is focused onto a track recorded on a disc 5 by an objective lens 4 through a half mirror 3. A light beam reflected by the disc 5 is collected by the objective lens 4 and is reflected by the half mirror 3 toward a prism 8 having a reflection surface 8A set substantially at a critical angle. The light beam reflected by the surface 8A is made incident upon four divided light receiving regions 100–103 of a photodetector 7. Photoelectrically converted output signals of the regions 100, 101 and 102, 103 are supplied to analog adders 9 and 10, respectively. Output signals of the adders 9, 10 are supplied to a first differential amplifier 11 to derive a first difference signal representing a deviation in the light amount. The output signals of the adders 9 and 10 are supplied to high pass filters 18 and 19, respectively which reduce low frequency components corresponding to the light amount to derive RF signal components modulated with the pit information. In the present embodiment, a cut-off frequency of the high pass filters 18 and 19 are set at 100 KHz, it is possible to obtain only signal components having frequencies higher than 100 KHz. The output signals of the high pass filters 18 and 19 are supplied to envelope detectors 13 and 14, respectively so as to detect envelope components. Then, output signals of the envelope detectors 13 and 14 are supplied to a differential amplifier 15 to derive a second difference signal which represents a variation in level of the reproduced RF signal. Therefore, the second difference signal becomes zero volt in the in-focused condition, but becomes a positive or negative voltage in dependence upon a direction of the deviation of the light spot with respect to the disc as described hereinafter. The first difference signal from the first differential amplifier 11 and the second difference signal from the second differential amplifier 15 are supplied to input terminals of an analog adder 16 to produce a composite focus information signal. The composite focus information signal thus obtained represents the focus error and is further supplied through a current amplifier 12 to a moving coil 6 as a focus control signal to drive the coil in accordance with the focus error. Since the moving coil 6 is fixed to the objective lens 4, the objective lens 4 is moved in its optical axis direction, and a distance from the disc surface to the objective lens 4 can be automatically controlled in accordance with the current through the moving coil 6. In this manner, a negative feed back loop for effecting the focus control is constructed and the objective lens 4 is always maintained in the in-focused condition.

FIG. 3 is a graph showing a relation between the output level of the high pass filters 18, 19 and the focus condition. In FIG. 3, a point a shows the in-focused condition at which the output levels of the high pass filters 18 and 19 are equal to each other. If the disc position varies too far or too close with respect to the objective lens in the in-focused condition, the output levels of the high pass filters 18 and 19 are changed in mutually opposite directions as shown in FIG. 3. In the present embodiment, the output voltage of the differential amplifier 15 is zero in the in-focused condition, and becomes positive and negative if the disc is too close and far, respectively, with respect to the objective lens 4.

As explained above in detail, in the apparatus for effecting the focus control in the optical disc player according to the invention, since the focus information derived from the variation in level of the reproduced RF signal is added to the usual focus signal derived from the variation in amount of light impinging upon the photodetector, it is possible to perform the focus control with a high accuracy without being affected by the variation of the light amount due to the unevenness of the reflection factor of the optical disc and the inclination of the optical disc. Generally, the focusing servo system for effecting a phase compensation comprises a plurality of control loops such as an integral control loop, a proportional control loop, and a differential control loop. The focus information obtained by the focus control apparatus according to the invention can be advantageously combined with the focus information derived in the differential control loop which is liable to be affected by a noise caused by the unevenness of the reflection factor of the disc and the inclination of the disc.

The present invention is not limited to the embodiment mentioned above, but many modifications and alternations can be conceived by those skilled in the art within the scope of the invention. For instance, in the above embodiment the photodetector comprises the four divided light receiving regions, but it may comprise two light receiving regions divided in the X-X direction. Further, the objective lens 4 may be driven in its optical axis direction by means of any driving mechanisms other than the moving coil. Moreover, the half mirror 3 may be replaced by a polarizing surface, and in this case a quarter wavelength plate is arranged between the polarizing surface and the optical disc. It should be noted that the reproduced information signal may be derived as a sum signal of the output signals from the adders 9 and 10. Moreover, in the above embodiment, the first focus information derived on the basis of the variation in amount of the light impinging upon the photodetector is produced by introducing the light reflected from the optical disc onto the reflection surface which is set at or near the critical angle, but according to the invention the first focus information can be derived by any suitable means other than the reflection surface set at or near the critical angle.

What is claimed is:

1. An apparatus for effecting a focus control for use in an optical disc player in which a light beam is projected onto an information track having a crenellated pit construction recorded on an optical disc as a light spot and a light beam modulated by said pit construction is made incident upon photoelectric converting means to produce an information signal, comprising:

means for introducing at least a part of said modulated light beam onto a photodetector having a plurality of light receiving regions divided in a given direction;

means for deriving a difference between output signals from said light receiving regions to produce a first focus information signal on a basis of a variation in amount of the light beam impinging upon the light receiving regions;

means for detecting, from the output signals of said plurality of light receiving regions of the photodetector, signal components modulated by the pit construction;

means for deriving a difference between said signal components to produce a second focus information signal on a basis of a variation in level of the signal components;

means for mixing said first and second focus information signals to produce a composite focus information signal; and means for effecting a focus control in response to said composite focus information signal to maintain the light spot focused on the optical disc.

2. An apparatus according to claim 1, wherein said means for introducing the light beam modulated by the pit construction onto the photodetector comprises a reflection surface which is set at or near a critical angle with respect to an incident light beam in an in-focused condition.

3. An apparatus according to claim 2, wherein said light receiving regions of the photodetector are divided in a direction parallel to a track direction.

4. An apparatus according to claim 2, wherein said light receiving regions are further divided in a direction perpendicular to the track direction.

5. An apparatus according to claim 4, wherein said first focus information signal producing means comprises:

a first adder having inputs connected to two light receiving regions on one side of the track direction to provide an output;

a second adder having inputs connected to two light receiving regions situated on another side of the track direction to provide an output; and a first differential amplifier having inputs connected to the outputs of said first and second adders.

6. An apparatus according to claim 5, wherein said means for detecting signal components comprises a first high pass filter coupled to the output of said first adder for passing high frequency components in output signals of said first adder to provide a first filtered output, a second high pass filter coupled to the output of said second adder for passing high frequency components in output signals of said second adder to provide a second filtered output, a first envelope detector coupled to detect envelope signals of said high frequency components in said first filtered output, and a second envelope detector coupled to detect envelope signals of said high frequency components in said second filtered output.

* * * * *